(12) United States Patent
Burkett

(10) Patent No.: US 11,808,524 B2
(45) Date of Patent: Nov. 7, 2023

(54) POWER PLANT COOLING SYSTEMS

(71) Applicant: Bob Burkett, Carrollton, TX (US)

(72) Inventor: Bob Burkett, Carrollton, TX (US)

( * ) Notice: Subject to any disclaimer, the term of this patent is extended or adjusted under 35 U.S.C. 154(b) by 12 days.

(21) Appl. No.: 17/475,310

(22) Filed: Sep. 14, 2021

(65) Prior Publication Data

US 2022/0107140 A1    Apr. 7, 2022

Related U.S. Application Data

(60) Provisional application No. 63/086,596, filed on Oct. 2, 2020.

(51) Int. Cl.
| | | |
|---|---|---|
| *F28D 20/00* | (2006.01) | |
| *F28D 21/00* | (2006.01) | |

(52) U.S. Cl.
CPC .. *F28D 20/0052* (2013.01); *F28D 2020/0078* (2013.01); *F28D 2021/004* (2013.01); *F28D 2021/0054* (2013.01)

(58) Field of Classification Search
CPC ......... F28D 20/0052; F28D 2020/0078; F28D 2021/004; F28D 2021/0054
USPC .......................................................... 165/45
See application file for complete search history.

(56) References Cited

U.S. PATENT DOCUMENTS

| | | | | |
|---|---|---|---|---|
| 4,560,533 A | * | 12/1985 | Huebotter | F28D 15/0275 976/DIG. 204 |
| 4,996,846 A | * | 3/1991 | Bronicki | F24T 10/20 60/641.2 |
| 2009/0049763 A1 | * | 2/2009 | Blundell | F24S 20/66 52/80.1 |
| 2009/0272511 A1 | * | 11/2009 | Petty | F24T 10/20 165/45 |
| 2010/0212858 A1 | * | 8/2010 | Guth | F24T 10/10 165/47 |
| 2013/0056170 A1 | * | 3/2013 | Klemencic | F24S 20/20 60/645 |
| 2014/0116045 A1 | * | 5/2014 | Mullard | F01K 13/00 122/412 |
| 2015/0168022 A1 | * | 6/2015 | Takata | F01K 9/003 60/671 |
| 2015/0345482 A1 | * | 12/2015 | Klitzing | F28B 11/00 60/671 |
| 2020/0027594 A1 | * | 1/2020 | Hunt | G21C 15/18 |
| 2020/0240654 A1 | * | 7/2020 | Saavedra | H02S 40/42 |
| 2021/0048229 A1 | * | 2/2021 | Niemi | F24T 10/15 |

FOREIGN PATENT DOCUMENTS

| | | |
|---|---|---|
| CN | 105484532 A | 4/2016 |
| KR | 102227888 B1 * | 3/2021 |

* cited by examiner

Primary Examiner — Jon T. Schermerhorn, Jr.

(57) ABSTRACT

Power Plant Cooling Systems are designed to replace Once-Through Cooling systems and/or cooling towers currently used to cool power plants that generate electricity. The intake and discharge piping of the cooling water would be connected by piping/tubing that would serve as a geothermal loop that would be underground and/or in a body of water next to the power plant that would serve as a heat exchange medium. An alternative embodiment would use a lattice-work of piping/tubing over the turbine hall (equipment building) and/or the containment building(s) to serve as a heat exchange medium when the atmospheric conditions are proper.

1 Claim, 5 Drawing Sheets

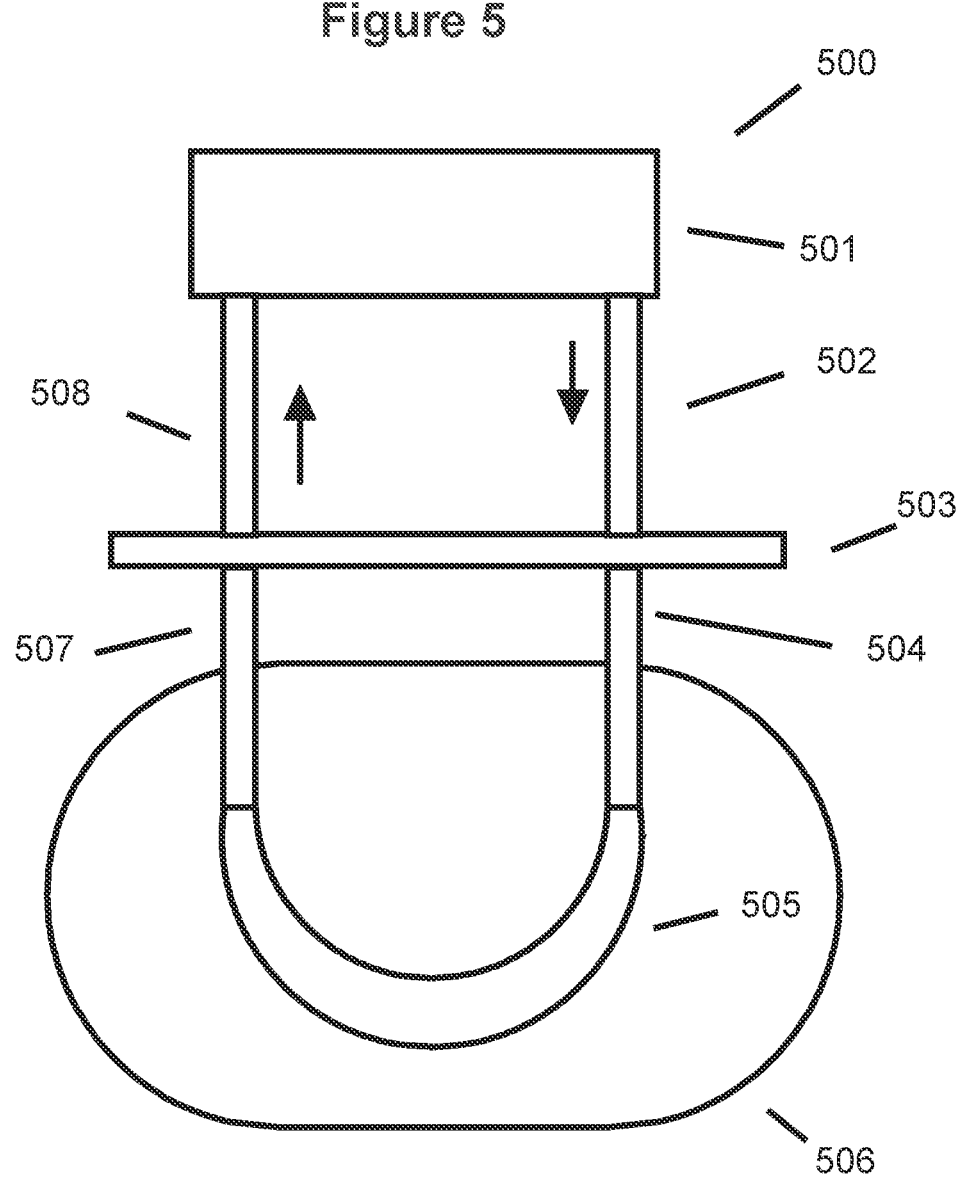

POWER PLANT COOLING SYSTEMS

CROSS-REFERENCE TO RELATED APPLICATIONS

This application claims the benefit of the filing of U.S. Provisional Patent Application No. 63/086,596 filed on Oct. 2, 2020.

BACKGROUND OF THE INVENTION

An electricity power plant usually requires water cooling by a source of water located by the power plant. A river, lake or ocean serves the purpose well. If a source of water is not located near by the plant, large parabolic or hyperboloid towers made of concrete or metal are used to cool the water that cycles through the plant.

The problem that exists is that if the river, lake or ocean used to cool the power plant is prohibited by law or for any other reason is no longer available for use (or partial use) then the power plant must find an alternative source of cooling.

An additional problem that arises is that construction of one or more parabolic cooling towers is very expensive. The costs can range into the billions of dollars. In addition, this cost may arise at a later stage of the power plants' projected useful life. This added time element adds to the uncertainty with regard to the cost effectiveness of the addition of the cooling towers.

BRIEF SUMMARY OF THE INVENTION

The purpose of this invention is to solve this problem with a cost effective solution. A nuclear power plant typically has one or more containment buildings that enclose the nuclear reactor(s). The purpose of the containment building is to provide a safety barrier should there be a release of radioactive material from the reactor into the atmosphere or the earth. These large spherical domes can be repurposed to also serve as a cooling system for the power plant. The water that is normally utilized for cooling from the power plant can either be partially or totally cooled by the modified containment structures. A latticework of piping (tubing) would be installed on the top and sides of the containment building that would serve as a radiator to dissipate the heat. An alternative embodiment would be the addition of a latticework of piping (tubing) installed on top of the Turbine Hall (equipment building) of the power plant that would serve as an open air cooling system.

The containment building would be retrofitted (or initially installed) with a latticework of piping (tubing) installed over the top and sides of the containment building that would serve as a radiator to expose the water to the outside air thereby cooling off the water and then returning it either to the power plant, the original water source or both. This system and method would use the containment building as a safety feature for radioactive releases and/or a cooling tower. An alternative embodiment would be the roof of the Turbine Hall that contains steam turbines, condensers, generators and other equipment necessary for the production of electricity. Any large flat roof structure situated by the power plant would also work. The cooling effect of the open air will be increased at night when the piping (tubing) is not exposed to the sun. The effectiveness of the open air cooling will be determined by the climate and the time of year.

Another cost effective solution to the cooling of the hot water emitted by the power plant would be the use of a geothermal system either as a standalone system or in combination with the open air cooling embodiment.

A power plant is usually located by a large body of water that could serve as a heat exchange medium for the power plant. An embodiment of this concept would be the intake and discharge piping of water into and out of a power plant. Normally, a Once Through Cooling (OTC) method is utilized. The water is piped into the plant, used for cooling purposes and then sent back into the original body of water. In this unique embodiment the intake and discharge piping of the water would be connected by piping (tubing) that would serve as a geothermal loop that would be underground and/or in the body of water next to the power plant. The piping (tubing) that connects the intake and discharge piping would be of sufficient length that the temperature underground or in the body of water could cool the hot water to the desired temperature by the time the water returns to the power plant. For example, hot water from a power plant would be piped under the ocean towards the intake pipe for the plant. As the water descends into the ocean it would be cooled. By the time the water has reached the intake pipe it would lose a percentage of its heat. On the return cycle back to the power plant the water would be cooled to the proper temperature. The geothermal loop may require a variety of different looping systems and designs of the pipe to accomplish this goal. This system and method would be more practical and economically viable compared to the building of a new air cooling tower(s).

BRIEF DESCRIPTION OF THE SEVERAL VIEWS OF THE DRAWINGS

FIG. 5 is a top down view of a geothermal design for cooling hot water emanating from the power plant with a large body of water and/or under the ground serving as a heat exchange medium.

DETAILED DESCRIPTION OF THE INVENTION

Figure 1:
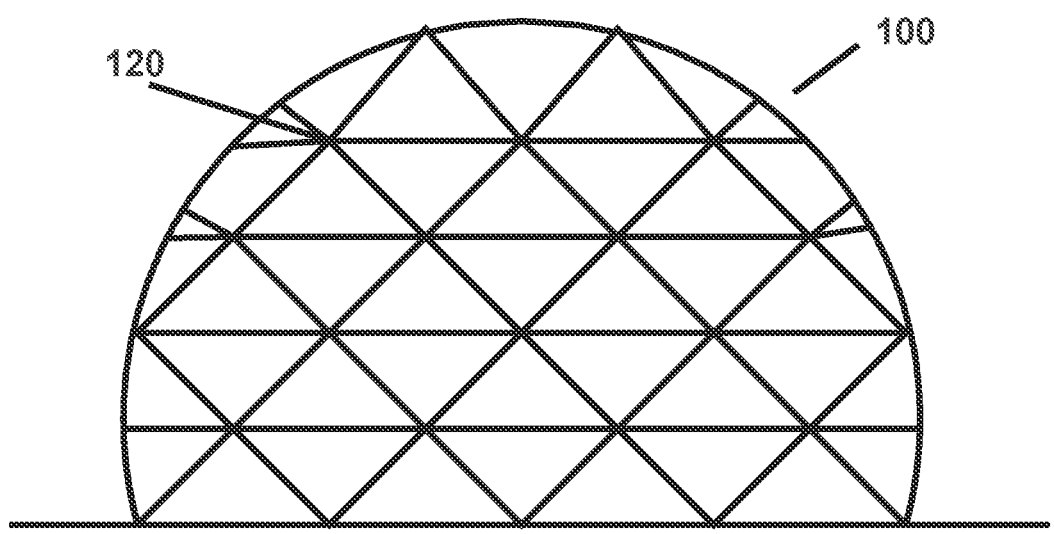
FIG. 1 is a view of a containment dome with a latticework of piping (tubing) on the outside of the dome. The number 100 represents the containment building. In this view the number 120 represents the piping (tubing) of the latticework that covers the containment building and pumps water through the latticework in order to cool the water. The design of the latticework in this embodiment is in the form of a geodesic dome. The dome design is based on a geodesic polyhedron. Another embodiment would be the installation of the latticework of piping (tubing) on the inside of the containment dome. (not shown)
Figure 2:
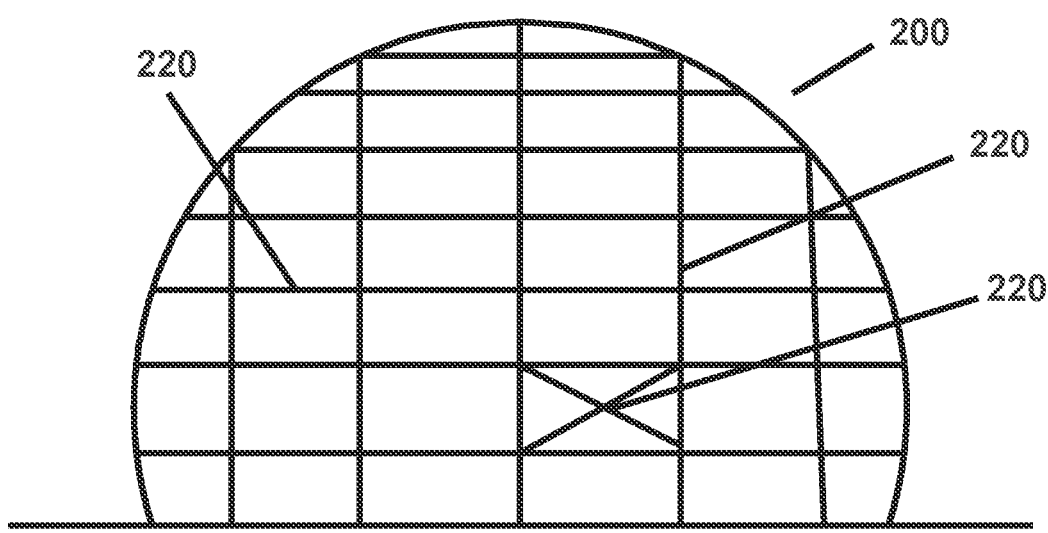
FIG. 2 is a view of a containment dome with a latticework of piping (tubing) on the outside of the dome. The number 200 represents the containment building. In this view the number 220 represents the piping (tubing) of the latticework that covers the containment building and pumps water through the latticework in order to cool the water. The design of the latticework is in a more generic design format. Another embodiment would be the installation of the latticework of piping (tubing) on the inside of the containment dome. (not shown)
Figure 3:
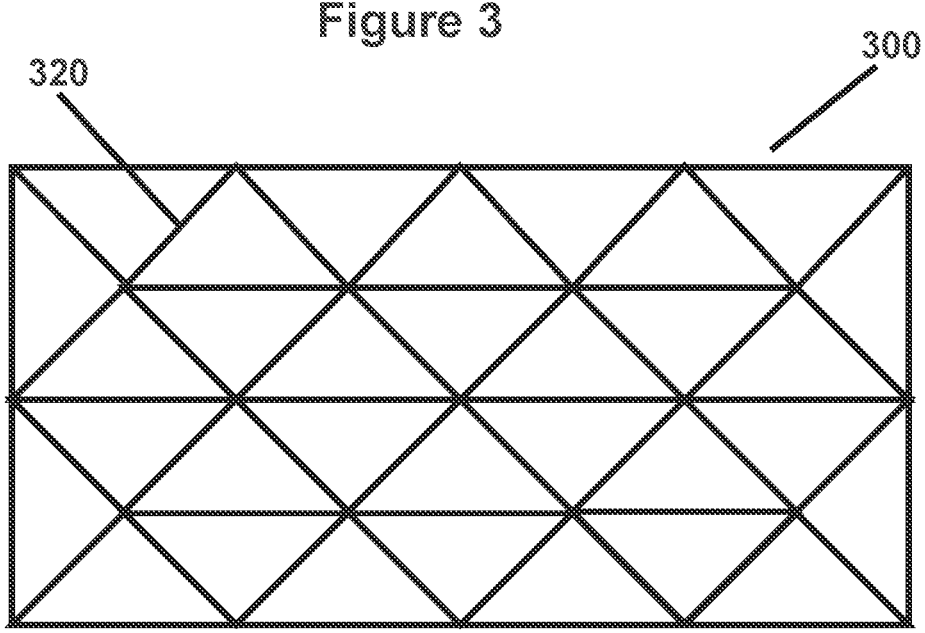
FIG. 3 is a top down view of a Turbine Hall (or similar flat roof building) with a latticework of piping (tubing). The number 300 represents the Turbine Hall (or similar flat roof building). In this view the number 320 represents the piping (tubing) of the latticework that covers the building and pumps water through the latticework in order to cool the water. The design of the latticework is in the form of a geodesic polyhedron however other geometric designs would work as well. Another embodiment would be the installation of the latticework of piping (tubing) on the inside of the building. (not shown)

A containment dome 100, 200 is covered with a latticework of piping (tubing) 120, 220 that pumps hot water through the latticework of piping (tubing) 120, 220 in order to cool the water sufficiently in order for it to be either reused by the power plant and/or sent back to its original source for example a river, lake or ocean. The latticework of piping (tubing) 120, 220 depicted in the drawings are a representation of any type of radiator style design that can cool the water. The latticework can consist of metal, painted PVC pipe and other materials. In one example, the water is initially drawn from the water source and sent to the power plant in order to cool various systems and then sent through the latticework of piping (tubing) 120, 220 in order to cool the heated water. The water is then returned to the power plant, an alternative system of cooling, the original water source or a combination of these options.

An alterative embodiment would be the utilization of the Turbine Hall (equipment building) 300 modified with the addition of a latticework of piping (tubing) 320 that can function as a cooling system. The hot water can be pumped to the top of the Turbine Hall (equipment building) 300 where it is cooled and returned to the Turbine Hall (equipment building) 300. The function of the latticework of piping (tubing) 320 is to serve as a radiator for the hot water to dissipate its heat. The systems and methods to transfer the water (i.e. pumping) are well known in the prior art and do not warrant further discussion.

Figure 4:
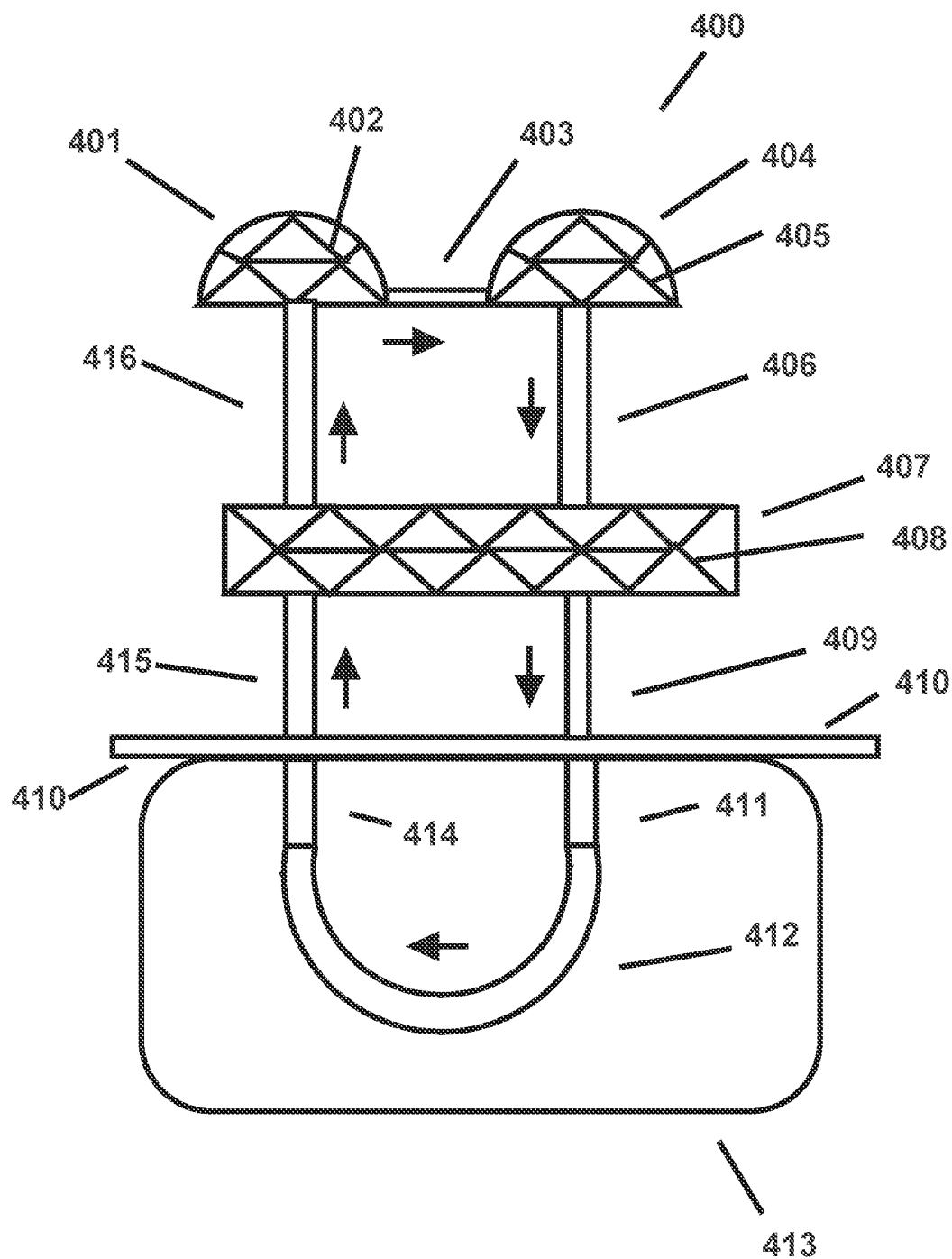
FIG. 4 is a top down view of a hybrid interconnected system of both an air cooled and geothermal cooled power plant with a large body of water and/or under the ground serving as a heat exchange medium.

Another alternative embodiment is the modification of a Once Through Cooling (OTC) system to serve as a delivery system for geothermal cooling utilizing a large body of water and/or underground as a heat exchange medium. A Once Through Cooling (OTC) system through a water intake pumps in water from an outside source (lake, river and ocean). The water is cycled through the power plants equipment for cooling purposes. In particular the cooling water passing through the condenser. The hot water is then sent back to the original source of the water via a discharge pipe. FIG. 4 400 is a depiction of a closed cycle circulation hybrid open air and geothermal cooling system. After the system is primed with water the cycle begins. In this embodiment, the cooled water would flow from containment building 401 through an exterior latticework of pipes (tubing) 402 via connector 403 to containment building 404 through an exterior latticework of pipes (tubing) 405. The water is pumped via connector 406 to the Turbine Hall (equipment building) 407. At this point the cooled water can either be sent through the latticework on top of the Turbine Hall (equipment building) 407 or sent into the building for cooling purposes. The cool water is utilized to cool the steam from the turbines, the condenser or any other necessary purpose (not shown). The hot water is sent to the latticework of piping (tubing) 408 on top of the roof for cooling and/or via connector 409 towards the geothermal cooling system. The hot water is transferred via connector 409 past the shoreline and/or underground passage 410 with connector 411 that connects the hot water to the geothermal loop 412 that cools the hot water with an underwater and/or underground heat transfer medium 413. The geothermal loop 412 represents single and/or multiple loops and various designs that increase the efficiency and effectiveness of the heat transfer medium. The cooled water is pumped back via a connector 414 past the shoreline or underground passage 410 with connector 415 where it returns to the Turbine Hall (equipment building) 408 to be reused again as cool water to cool hot steam from the turbines, condensers and any other hot components and/or systems that need to be cooled. The hot water can then be sent back to the containment building 401 via connector 416 where the cycle begins again. Another embodiment would be to have the hot water directly routed to the geothermal loop system with connector 409 and complete the geothermal cycle without utilizing the containment buildings or the Turbine Hall. This embodiment is detailed in FIG. 5. Those who are skilled in the art will know that a variety of different paths of the hot water being transformed to cool water are possible. The possibility exists that the hot water could be simultaneously sent to the containment building(s), Turbine Hall (equipment building) and/or the geothermal loop or any combination therein.

FIG. 5 is a depiction of the intake and discharge piping of a power plant's closed recirculating cooling water system connected to a geothermal loop either submerged in water and/or under the ground. FIG. 5 500 is a top down view of this embodiment. The power plant's Turbine Hall (equipment building) 501 is the source of the hot water that needs to be cooled. The hot water travels through the connector 502 past the shoreline and/or underground passage 503 at this point the hot water is carried by a connector 504 to the geothermal loop 505 that cools the water. This geothermal loop 505 can take a variety of different shapes, sizes, and looping tactics that all contribute to the effectiveness of the cooling process. The geothermal loop is submerged under water and/or under the ground 506. The cooled water is then carried through connector 507 past the shoreline and/or underground passage 503 to connector 508 where it is returned to the Turbine Hall (equipment building) 501 and the cooling process begins again. The piping (tubing) connectors 502, 504, 507, 508 and the geothermal loop 505 can be separate connections and/or joined together as a single loop. The reference to the Turbine Hall (equipment building) 501 also refers to other buildings that contain components that need to be cooled. Any large building with a flat roof could be utilized as an open air cooling system with a latticework of pipes (tubing). An alternative embodiment would be the latticework of pipes (tubing) on the inside of the building.

LIST OF REFERENCE NUMERALS

100. Containment dome
120. Latticework of piping (tubing)
200. Containment dome
220. Latticework of piping (tubing)
300. Turbine Hall (equipment building)
320. Latticework of piping (tubing)
400. Hybrid open air and geothermal cooling
401. Containment Building
402. Latticework of piping (tubing)
403. Connector
404. Containment Building
405. Exterior latticework of piping (tubing)
406. Connector
407. Turbine Hall (equipment building)
408. Latticework of piping (tubing)
409. Connector 410. Shoreline and/or underground passage
411. Connector
412. Geothermal loop
413. Body of water and/or underground heat transfer medium
414. Connector
415. Connector
416. Connector
500. Geothermal cooling system
501. Turbine Hall (equipment building)
502. Connector
503. Shoreline or underground passage
504. Connector
505. Geothermal loop
506. Body of water and/or underground heat transfer medium
507. Connector
508. Connector

The invention claimed is:

1. A system for cooling an electricity power plant, said system comprising:
a turbine hall and;
a closed cycle circulation geothermal cooling system,
wherein the closed cycle cooling system includes:
a plurality of fluid connectors;
a first at least one of said connectors located between the turbine hall and a geothermal piping loop which is submerged in a river, lake, and/or ocean; and
a second at least one of said connectors located between the geothermal piping loop and the turbine hall;
wherein the closed cycle cooling system is configured such that:
fluid in the closed cycle flows from the turbine hall to the geothermal piping loop via the first connector(s),
then from the geothermal piping loop to the turbine hall via the second connector(s), at which point the fluid flow can be directed to flow through the turbine hall for cooling or to one or more auxiliary locations and then back to the turbine hall, wherein the fluid directed to flow through the turbine hall and the fluid which is directed back to the turbine hall are then directed back to the geothermal piping loop via the first connector(s).

* * * * *